March 3, 1936.    W. J. MORRILL    2,033,047
CONDENSER MOTOR
Filed Oct. 8, 1932
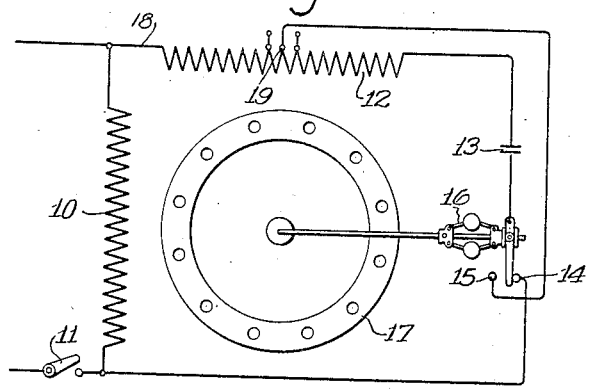
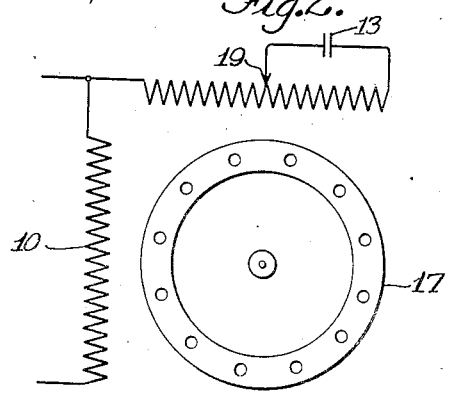
Inventor:
Wayne J. Morrill,
by Chas. V. Tulla
His Attorney Patented Mar. 3, 1936

2,033,047

UNITED STATES PATENT OFFICE 2,033,047

CONDENSER MOTOR

Wayne J. Morrill, Fort Wayne, Ind., assignor to General Electric Company, a corporation of New York Application October 8, 1932, Serial No. 636,891

1 Claim. (Cl. 172—233)

My invention relates to single phase condenser motors and in particular to a simple arrangement for utilizing the condenser to best advantage under both starting and running conditions.

In single phase motors split phase starting may be obtained by the use of a condenser in the circuit of the starting winding. The starting winding circuit may be left connected across the line for running purposes or cut out as desired. However when the condenser circuit is employed during running operation for power factor correction it is desirable to make some change therein between starting and running conditions because the value of the capacitance suitable for starting is not what is desired during running and the voltage to which the condenser is subjected if no change is made is decidedly different under the two conditions.

In accordance with my invention the starting winding including the condenser is connected in parallel with the main winding in the usual way for starting purposes and the condenser and the starting winding or a portion thereof is connected in a closed tertiary circuit for running purposes. By this arrangement the desired change in capacitance between starting and running conditions is obtained, the condenser is not subjected to an excessive voltage under running conditions and these results are obtained by a very simple change in connections and without the use of additional equipment.

The features of the invention which are believed to be novel and patentable will be pointed out in the claim appended hereto. For a better understanding of my invention reference is made to the accompanying drawing illustrating a preferred form of my invention in Fig. 1, and in Fig. 2 a simplified diagram of the running connections.

Referring to the drawing the line connections of the motor are across the main primary winding 10 through a disconnecting switch 11. The starting winding 12 and condenser 13 in series are connected in parallel with the main winding 10 at start through the switch contact 14. During running the condenser 13 is connected across a suitable portion of the starting winding 12 through switch contact 15. Fig. 2 shows the simplified running connection. I have shown a speed responsive device 16 for making this change in connections between starting and running conditions but this form of switch is not essential. The secondary 17 of the motor is represented as of the squirrel cage induction type and as the rotor member.

The main and starting windings are illustrated as being displaced in axes at 90 electrical degrees to each other although I do not wish to be limited to this particular angle of displacement.

During starting it will be seen that the connections are those usually employed in motors of this type. The condenser 13 in series with the starting winding produces a current in this circuit which leads that in the main winding 10, accomplishing a split in the phase and a high starting torque. It will appear that the value of the capacitance and its voltage rating may be particularly selected to fit these starting requirements without being limited by the necessity of selecting a condenser that will meet the requirements of running conditions with the same connections, or else of resorting to some one of the more complicated and expensive change over schemes of the prior art.

The reasons for this is that by my invention I may connect the condenser across any selected portion of the starting winding such that the voltage imposed thereon during running conditions will not exceed the voltage to which the condenser is subjected during starting at the same time reducing the capacitance effect as desired.

It is known that due to the absence of transformer action between quadrature windings 10 and 12 at start and the presence of transformer action through the revolving secondary during running that the voltage across the starting winding materially increases as the motor comes up to speed. This is true to a lesser extent if the primary windings are displaced in other than the quadrature relation. Also that if the condenser is left in the starting connection after the motor comes up to speed the voltage across it will very materially increase. This is because the arithmetical sum of the voltages across winding 12 and condenser 13 is greatly in excess of their vectional sum which must equal the line voltage if the circuit remains connected across the line. With my running connection the condenser is connected to the line through a transformer comprising all three windings of the motor. The value of the capacitance as reflected in the line is not as great as at starting in any event, assuming the condenser to be subjected to the same voltage under both conditions because of the transformer connection. This is as it should be since the value of the capacitance at start should be greater than for running. It is therefore seen that if I connect the condenser across such a portion of the starting winding used as the secondary of a transformer that the voltage to which the condenser is subjected is the same as at start, the capacitance effect will be less than at start. I may then decrease the capacitance effect to the desired amount for running purposes by shortening that portion of winding 12 across which the condenser is connected. In the running condition winding 12 serves merely as a tertiary transformer winding and it would make no difference if its connection to the line and main winding 10 were opened at point 18, since the tertiary circuit comprising condenser 13 and winding 12 are now conductively segregated from the main winding and line. If it is desired to vary the running power factor of the motor the point of tap 19 may be changed. Conditions may arise where it may be desirable to connect the condenser across the entire starting winding.

It is thus seen that I accomplish the results that have heretofore been obtained with the use of an external tap changing transformer such as is shown in Bailey Patent No. 1,707,423, April 2, 1929, and without the expense of such extra transformer.

What I claim as new and desire to secure by Letters Patent of the United States is:

A split-phase induction motor having main and starting windings connected together at one end, a condenser, and a two-way switch having a movable switch blade which is permanently connected to the other end of said starting winding through said condenser and having alternate stationary contacts, one of which is connected to the other end of said main winding and the other of which is connected to an intermediate point in said starting winding whereby the main and starting windings are connected in parallel through said condenser when the switch is in one position and the condenser is connected across a portion of the starting winding in a tertiary circuit electrically segregated from the main winding when the switch is in the other position.

WAYNE J. MORRILL.